(12) United States Patent
Dischino et al.

(10) Patent No.: US 12,544,046 B2
(45) Date of Patent: Feb. 10, 2026

(54) FLUID SAMPLE COLLECTION CONTAINER AND LID WITH VENTED SEAL CONFIGURATION

(71) Applicant: Becton, Dickinson and Company, Franklin Lakes, NJ (US)

(72) Inventors: Kevin Joseph Dischino, Park Ridge, NJ (US); Anthony V. Torris, Mercer Island, WA (US); Robert G. Ellis, Wayne, NJ (US); Michael Bailey, Creedmoor, NC (US)

(73) Assignee: Becton, Dickinson and Company, Franklin Lakes, NJ (US)

(*) Notice: Subject to any disclaimer, the term of this patent is extended or adjusted under 35 U.S.C. 154(b) by 354 days.

(21) Appl. No.: 18/013,017

(22) PCT Filed: Jun. 30, 2021

(86) PCT No.: PCT/US2021/039868
§ 371 (c)(1),
(2) Date: Dec. 27, 2022

(87) PCT Pub. No.: WO2022/006258
PCT Pub. Date: Jan. 6, 2022

(65) Prior Publication Data
US 2023/0301638 A1 Sep. 28, 2023

Related U.S. Application Data

(60) Provisional application No. 63/047,051, filed on Jul. 1, 2020.

(51) Int. Cl.
*A61B 10/00* (2006.01)

(52) U.S. Cl.
CPC ........ *A61B 10/007* (2013.01); *A61B 10/0096* (2013.01)

(58) Field of Classification Search
CPC .............. A61B 10/007; A61B 10/0096; A61B 10/0045; A61B 5/1438
(Continued)

(56) References Cited

U.S. PATENT DOCUMENTS

| 4,300,404 A | 11/1981 | Mehl et al. |
| 4,646,947 A | 3/1987 | Stull |

(Continued)

FOREIGN PATENT DOCUMENTS

| CN | 103118955 A | 5/2013 |
| CN | 104066384 A | 9/2014 |

(Continued)

*Primary Examiner* — Robert R Raevis
(74) *Attorney, Agent, or Firm* — The Webb Law Firm

(57) ABSTRACT

A container assembly for collecting a fluid specimen including a collection container having a first end, a second end, and a sidewall extending therebetween and defining a chamber for receiving the fluid specimen. The container assembly may include a container lid couplable to the collection container to at least partially close the first end thereof. The container lid may include a sealing interface configured to at least partially contact the collection container when the container lid is coupled to the collection container. The sealing interface may include a textured sealing surface region configured to allow air into or out of the container assembly when the container lid is coupled to the collection container, while maintaining a substantially fluid-tight seal between the container lid and the collection container.

16 Claims, 3 Drawing Sheets

(58) Field of Classification Search
USPC ...... 73/863.52, 863.81, 864, 864.34, 864.51,
73/864.52, 864.74, 864.91; 600/573, 576,
600/577; 200/200, 220
See application file for complete search history.

(56) References Cited

U.S. PATENT DOCUMENTS

| | | |
|---|---|---|
| 5,972,292 A | 10/1999 | Demeo |
| 6,802,428 B2 | 10/2004 | Ekkert |
| 2002/0056695 A1 | 5/2002 | Boulange et al. |
| 2005/0112024 A1* | 5/2005 | Guo ................... A61B 10/0096 |
| | | 422/562 |
| 2011/0094319 A1 | 4/2011 | Yong |
| 2013/0175266 A1 | 7/2013 | Ellis |
| 2017/0042460 A1 | 2/2017 | Holmes et al. |
| 2018/0125464 A1 | 5/2018 | Kolb et al. |

FOREIGN PATENT DOCUMENTS

| | | | |
|---|---|---|---|
| CN | 204882557 U | * | 12/2015 |
| JP | H299757 U | | 8/1990 |
| JP | H595668 U | | 12/1993 |
| JP | 2008137710 A | | 6/2008 |
| JP | 2015503762 A | | 2/2015 |
| JP | 2019184564 A | | 10/2019 |

* cited by examiner

FLUID SAMPLE COLLECTION CONTAINER AND LID WITH VENTED SEAL CONFIGURATION

CROSS-REFERENCE TO RELATED APPLICATIONS

This application is the United States national phase of International Application No. PCT/US2021/039868 filed Jun. 30, 2021, and claims priority to U.S. Provisional Application Ser. No. 63/047,051, entitled "Fluid Sample Collection Container and Lid with Vented Seal Configuration", filed Jul. 1, 2020, the entire disclosures of which are hereby incorporated by reference in their entirety.

BACKGROUND

Field of the Disclosure

The present disclosure relates generally to a container assembly for collecting a fluid specimen. More particularly, the present disclosure relates to a container assembly including a vented seal configuration between a collection container and a container lid.

Description of the Related Art

To conduct laboratory testing on biological fluid samples such as urine, it is necessary to provide a container for collecting the fluid sample. These collection containers typically include a cup-shaped container with a removable lid. Once a fluid sample has been collected in the container, the lid is reapplied. The collection container may then be transported to a laboratory or other testing facility where a sample of the collected specimen is extracted for test purposes.

To simplify the sample extraction process, prior collection containers have used lids which not only cover and seal the collection container, but also provide for the use of an extraction device which permits the extraction of a sample of the fluid specimen. Such lids may include a receptable or cavity which supports a tube extending within the cavity to the lower end of the cup-shaped container in fluid communication with the specimen contained within the container. The tube or the lid may include a needle so that an air-evacuated collection device (e.g., a specimen collection tube) may be attached thereto to draw a portion of the collected sample thereinto without the need for removal of the lid. In such configurations, the sample can be removed without spilling or contaminating the sample and/or cavity area. Subsequent samples may be drawn from the collection container by using a plurality of collection tubes.

However, prior collection containers utilize an interface between the lid and the cup-shaped collection container that, when closed properly, hermetically seals the connection interface between the lid and the container. With such a complete seal between the container and the lid, there is potential for specimen collection tubes to under-fill when drawing the fluid from the container into the evacuated collection tubes. This possible under-fill is due to the generation of a vacuum within the headspace of the container above the fluid specimen as the fluid (e.g., urine) is drawn from the container into a collection tube. The vacuum generated in the headspace makes it more difficult for the evacuated collection tube to pull the fluid out of the container, thereby creating the potential for under-fill and/or slow fill times. The under-fill and/or slow-fill issue may be exacerbated when older evacuated collection tubes are used, as the tubes themselves may not be as effective in pulling the fluid from the container.

Previous designs have attempted to mitigate this issue by making the overall container assembly (and, thus, the headspace) larger. However, such a solution results in unnecessarily large container assemblies, which adds significant material costs.

Alternatively, if the user wishes to release the vacuum, the lid must be partially unsealed from the collection container. However, unsealing of the lid may lead to significant leaks from the container during specimen collection, transport, and/or storage.

SUMMARY

In view of the foregoing, there exists a need for a seal configuration between a collection container and a lid which allows for improved tube fill, irrespective of volume of fluid within the collection container, the size of the collection container, and/or the age of tube, while still preventing fluid leakage out of the collection container during collection, transport, and/or storage.

In accordance with an embodiment of the present invention a container assembly for collecting a fluid specimen includes a collection container having a first end, a second end, and a sidewall extending therebetween and defining a chamber for receiving the fluid specimen. The assembly also includes a container lid couplable to the collection container to at least partially close the first end thereof, wherein the container lid comprises an elongate receptacle extending into the chamber of the collection container. The receptacle includes an open end defined within an upper surface of the container lid and being configured to receive a specimen collection tube therein. The container lid includes a sealing interface configured to at least partially contact the collection container when the container lid is coupled to the collection container. The sealing interface includes a textured sealing surface region configured to allow air into or out of the container assembly when the container lid is coupled to the collection container while maintaining a substantially fluid-tight seal between the container lid and the collection container.

Optionally, the textured sealing surface region may be formed by a chemical etching process. The container lid may be threadingly couplable to the collection container. In certain configurations, the collection container further includes a stop ring extending circumferentially thereabout at a location below an exterior threaded portion of the collection container. The container lid may also include a flange extending around an outer rim thereof, and wherein a lower surface of the flange is configured to contact an upper surface of the stop ring when the container lid is fully coupled to collection container. The lower surface of the flange may include a secondary textured sealing surface region configured to allow air into or out of the container assembly when the container lid is coupled to the collection container. Optionally, the flange may include an interior threaded portion configured to enable the container lid to be threadingly coupled to the exterior threaded portion of the collection container. The flange may include a plurality of ribs extending circumferentially thereabout.

In accordance with another embodiment of the present invention, a container lid for use with a container assembly for collecting a fluid specimen includes a disc-shaped peripheral zone, a central zone positioned within the peripheral zone, wherein the central zone includes an elongate receptacle extending downward therefrom. The receptacle has an open end defined on an upper surface of the central zone and configured to receive a specimen collection tube therein. The container lid further includes a flange extending downward from the peripheral zone, wherein the flange comprises an inner surface configured to releasably engage with a collection container. At least a portion of the inner surface includes a textured sealing surface region.

In certain configurations, the textured sealing surface region is formed by a chemical etching process. The inner surface may further include a threaded portion configured to enable the container lid to be threadingly coupled to an exterior threaded portion of a collection container. The flange may also include a lower surface, and the lower surface may include a secondary textured sealing surface region configured to allow air into or out of the container assembly when the container lid is coupled to a collection container. Optionally, the secondary textured sealing surface region is formed by a chemical etching process. The flange may also include a plurality of ribs extending circumferentially therearound.

In accordance with a further embodiment of the present invention, a method of forming a container assembly for collecting a fluid specimen includes providing a collection container having a first end, a second end, and a sidewall extending therebetween and defining a chamber for receiving the fluid specimen. The method also includes providing a container lid couplable to the collection container to at least partially close the first end thereof, wherein the container lid includes an elongate receptacle extending downward therefrom, the receptacle configured to receive a specimen collection tube therein. The container lid further includes a flange extending around an outer rim thereof, wherein an inner surface of the flange has a textured sealing surface region formed thereon. When the container lid is coupled to the collection container, the textured sealing surface region of the container lid contacts a surface of the collection container so as to allow air into or out of the container assembly while maintaining a substantially fluid-tight seal with the collection container.

In certain configurations, the method further includes forming a stop ring extending circumferentially about the collection container. The method may also include forming a secondary textured sealing surface region on a lower surface of the flange, wherein the lower surface of the flange is configured to contact an upper surface of stop ring when the container lid is fully coupled to collection container.

Further details and advantages of the present disclosure will be understood from the following detailed description read in conjunction with the accompanying drawings.

DESCRIPTION OF THE INVENTION

Figure 1:
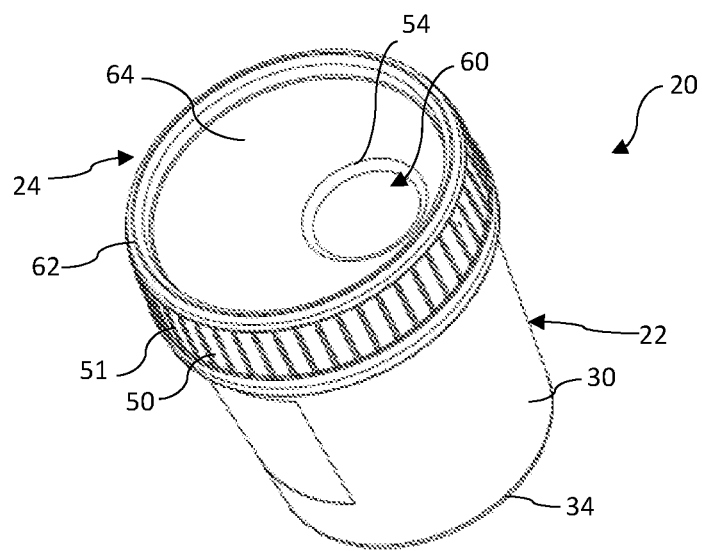
FIG. 1 is a perspective view of a collection container assembly in accordance with an aspect of the present disclosure.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIG. 1, a collection container assembly 20 in accordance with an aspect of the present disclosure is shown. Collection container assembly 20 includes a collection container 22 and a container lid 24. An exemplary collection container assembly 20 in accordance with the present disclosure may be used to safely collect a fluid specimen (e.g., urine), transport the fluid specimen, and draw a sample of the fluid specimen.

Figure 2:
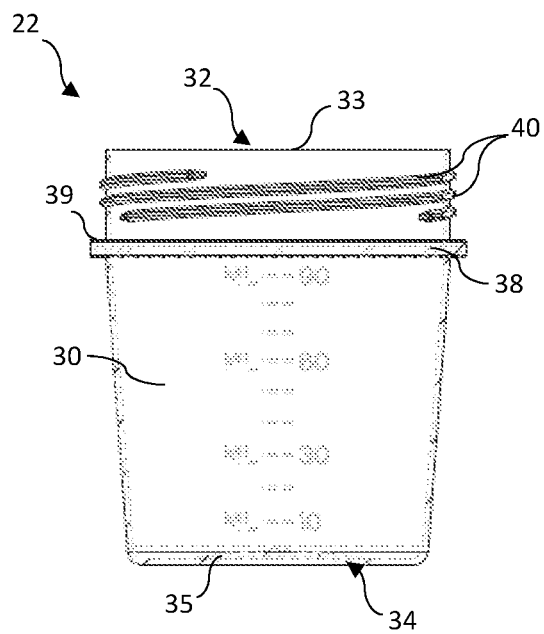
FIG. 2 is a side view of a collection container of the collection container assembly shown in FIG. 1.

Referring to FIGS. 1 and 2, collection container 22 generally includes a sidewall 30 extending between a first, open end 32 and a second, closed end 34. Sidewall 30 defines an interior chamber for receiving a fluid specimen such as, e.g., urine. In one embodiment, sidewall 30 of container 22 comprises a slightly tapering, tubular vessel having continuous, tapered sidewalls 30. Open end 32 defines a lip 33 and includes an exterior threaded portion 40 around a perimeter thereof. Closed end 34 comprises a bottom wall 35. In one embodiment, the collection chamber of container 22 is suitable for holding biologically hazardous materials. In one embodiment, sidewall 30 of collection container 22 may include at least one fill level indicator which identifies a fluid level of a collected fluid specimen.

In one embodiment, collection container 22 and container lid 24 may be formed from any conventional material such as, e.g., a polymeric resin. Polymeric resins are well known in the art and include, for example, polyethylene, polycarbonate, polystyrene, and similar polymeric resinous materials. However, it is to be understood that collection container 22 and/or container lid 24 may be formed of other appropriate materials, and may be formed of different materials.

Figure 3:
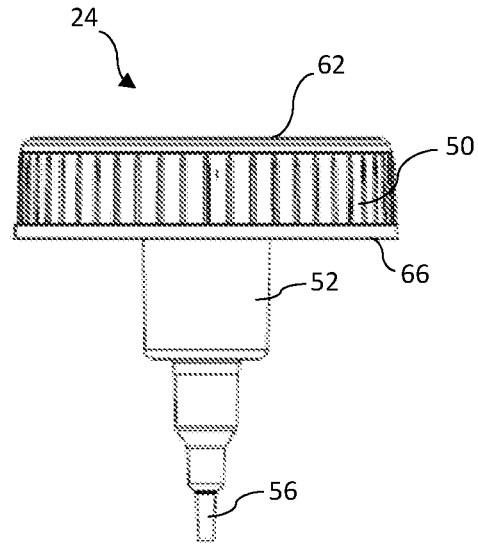
FIG. 3 is a side view of a container lid of the collection container assembly shown in FIG. 1.

Referring to FIG. 1 and FIG. 3, container lid 24 generally includes a flange 50 extending around its outer rim, with flange 50 being sized to provide a tight fit upon the collection container 22 when container lid 24 is placed over the first, open end 32 of collection container 22. Flange 50 of container lid 24 may include a plurality of ribs 51 disposed on an exterior surface of flange 50. Ribs 51 may provide a gripping means to allow a user or a tool to more easily grasp container lid 24 when attaching or detaching container lid 24 to collection container 22.

Figure 4A:
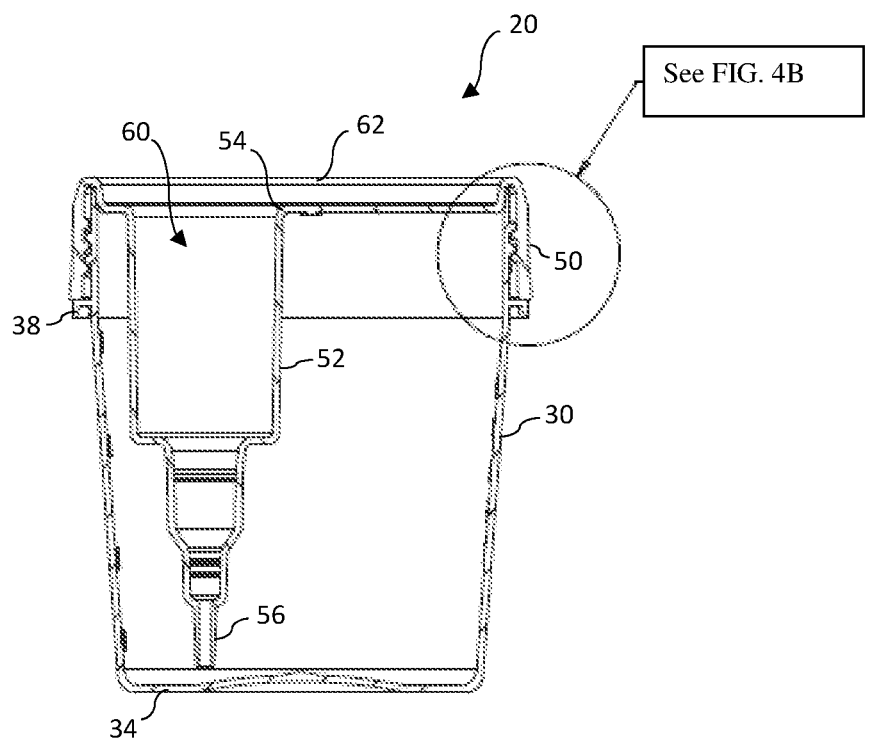
FIG. 4A is a cross-sectional view of the collection container assembly shown in FIG. 1.
Figure 4B:
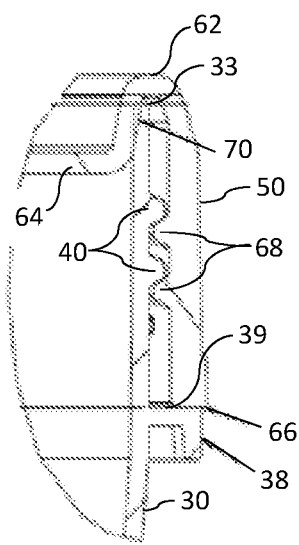
FIG. 4B is a detailed cross-sectional view of a portion of the collection container assembly shown in FIG. 1.

Additionally, container lid 24 also includes an elongate receptacle 52 extending into collection container 22 towards bottom wall 35 of collection container 22. Receptacle 52 includes an open end 54 and an opposing lower end 56, with a receiving cavity 60 defined therein. In one embodiment, receiving cavity 60 is sized and shaped to receive a specimen collection tube such as, e.g., an evacuated tube (not shown). In this way, a fluid specimen within collection container 22 can be transferred to the specimen collection tube without the need to remove container lid 24. While not shown, in one embodiment, receptacle 52 includes a needle or cannula configured to pierce the stopper of a specimen collection tube to allow the specimen to be drawn from the collection container 22 into the specimen collection tube. As receptacle 52 extends far into collection container 22 when container lid 24 is attached thereto (as shown in FIG. 4B), the needle is well-protected within receptable 52, thereby reducing the risk of needle-stick injuries to the user.

Referring still to FIG. 1 and FIG. 3, in one embodiment, container lid 24 includes a generally disc-shaped component having an outer or peripheral zone 62 and an inner or central zone 64. Flange 50 extends downward from peripheral zone 62 of container lid 24. As is shown in FIGS. 4A-5B, flange 50 includes an inner surface which includes a means or mechanism for sealingly engaging container lid 24 with open end 32 of collection container 22. In one embodiment, flange 50 includes an interior threaded portion 68, thereby enabling container lid 24 to be threadingly connectable to open end 32 of collection container 22 via mating threaded portions 40, 68, as shown in FIG. 4B. In other embodiments, the sealing portion of container lid 24 may include a snap fit mechanism, a ball detent, an interference fit mechanism, locking tabs, a spring loaded locking mechanism, a latch, or other similar mechanism to sealingly engage container lid 24 to collection container 22, thereby substantially preventing a fluid specimen contained within collection container 22 and container lid 24 from leaking out, while also preventing contaminants from entering.

As is shown in FIG. 2, collection container 22 further includes a stop ring 38 extending circumferentially around the collection container 22 at a location below the exterior threaded portion 40. The stop ring 38 includes an upper surface 39. When the container lid 24 is secured upon the collection container 22, the stop ring 38 is configured prevent over-torque/over-rotation of the container lid 24 on the collection container 22. Additionally, in one embodiment, stop ring 38 acts as a secondary sealing surface so as to prevent fluid leakage from the collection container 22. Specifically, referring to FIG. 4B, a lower surface 66 of flange 50 is configured to contact upper surface 39 of stop ring 38 when the container lid 24 is fully connected to collection container 22. In this way, upper surface 39 acts as a stop to prevent over-rotation of the container lid 24, which, in turn, prevents a sealing surface 70 on container lid 24 from over-tightening (or "bottoming out") on lip 33 of the collection container 22. The interface between upper surface 39 of stop ring 38 and lower surface 66 of flange 50 also acts as a secondary sealing surface in the event that fluid leaks past the interface between sealing surface 70 and lip 33.

As noted above, in conventional container lids and collection containers, the connection interface between the lid and the container is generally completely sealed from the ingress/egress of not only fluid(s), but also air. With such a complete seal between the container and the lid, there is potential for specimen collection tubes to under-fill when drawing the fluid from the container into the evacuated collection tubes due to a vacuum created within the headspace of the container above the fluid specimen as the fluid is withdrawn from the container. However, referring to FIGS. 5A and 5B, container lid 24 in accordance with one embodiment of the present disclosure is shown in greater detail, wherein container lid 24 is configured so as to prevent or substantially reduce any vacuum created within the headspace of the collection container upon which it is coupled.

Figure 5A:
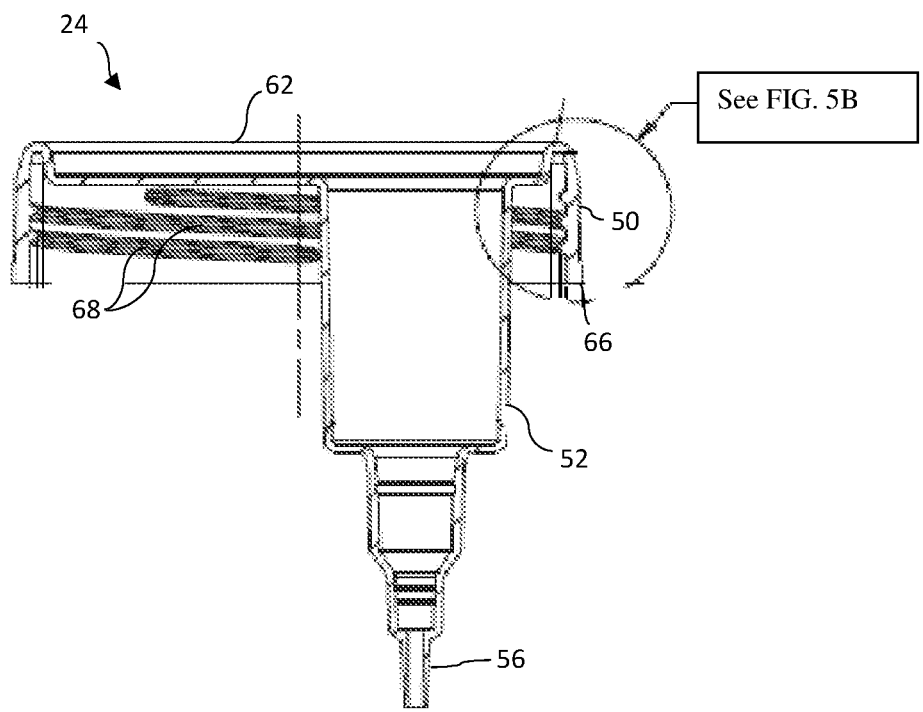
FIG. 5A is a cross-sectional view of the container lid shown in FIG. 3.
Figure 5B:
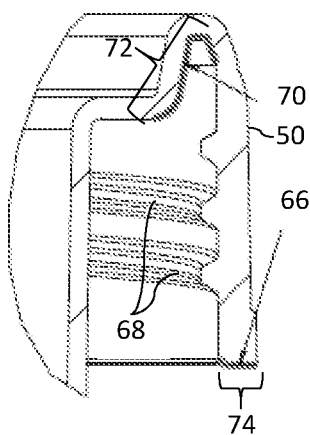
FIG. 5B is a detailed cross-sectional view of a portion of the container lid shown in FIG. 3.

Specifically, referring to FIG. 5B, the sealing interface 70 of container lid 24 includes a sealing surface region 72. Sealing surface region 72 is a textured or roughened portion of the sealing interface 70 which provides venting to and from the headspace above the fluid specimen within the collection container 22. In this way, as the fluid specimen is withdrawn from the collection container assembly 20 via an evacuated tube (not shown), no vacuum is formed in the headspace, thereby allowing the evacuated tube to fill without resistance typically caused by such a vacuum.

While the textured sealing surface region 72 allows air to vent into and out of the collection container assembly 20, the permeability is sufficiently low that fluid leakage is substantially prevented or minimized, even when the collection container assembly 20 is tilted or jostled during transport. The texture on sealing surface region 72 may be formed through any appropriate method such as, e.g., a chemical etching process during the injection molding of container lid 24. Examples of appropriate textures include Mold-Tech MT11000, MT11010, and MT11020. However, it is to be understood that other textures and/or methods of producing such textures may be utilized in accordance with the present disclosure.

Furthermore, while FIG. 5B shows sealing surface region 72 as extending along a defined portion of sealing interface 70, it is to be understood that sealing surface region 72 may extend across more or less of the sealing interface 70 of container lid 24. Additionally and/or alternatively, while not shown, it is to be understood that the collection container 22 may include a textured sealing surface region at the sealing interface between collection container 22 and container lid 24.

Referring still to FIG. 5B, in one embodiment of the present disclosure, container lid 24 further includes a secondary sealing surface region 74 at lower surface 66 of flange 50. Like sealing surface 72 described above, secondary sealing surface region 74 is textured to allow air to vent into and out of the collection container assembly 20 as the lower surface 66 of flange 50 contacts upper surface 39 of stop ring 38 when the container lid 24 is fully connected to collection container 22. Thus, while the interface between upper surface 39 and lower surface 66 acts to prevent both over-tightening and fluid leakage between the container lid 24 on collection container 22, the textured secondary sealing surface 74 allows for breathability such that the formation of a vacuum in the headspace above the fluid specimen can be avoided.

The texture on secondary sealing surface region 74 may also be formed through any appropriate method such as, e.g., a chemical etching process during the injection molding of container lid 24. Similar to sealing surface region 72, examples of appropriate textures include, e.g., Mold-Tech MT11000, MT11010, and MT11020. However, it is to be understood that other textures and/or methods of producing such textures may be utilized in accordance with the present disclosure. Additionally and/or alternatively, while not shown, it is to be understood that the upper surface 39 of stop ring 38 may include a textured sealing surface region at the sealing interface between collection container 22 and container lid 24.

While several embodiments of a fluid sample collection container assembly are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A container assembly for collecting a fluid specimen, comprising:
    a collection container having a first end, a second end, and a sidewall extending therebetween and defining a chamber for receiving the fluid specimen; and
    a container lid couplable to the collection container to at least partially close the first end thereof, wherein the container lid comprises an elongate receptacle extending into the chamber of the collection container, the receptacle having an open end defined within an upper surface of the container lid and being configured to receive a specimen collection tube therein,
    wherein the container lid comprises a sealing interface configured to at least partially contact the collection container when the container lid is coupled to the collection container, and
    wherein the sealing interface includes a textured sealing surface region configured to allow air into or out of the container assembly when the container lid is coupled to the collection container while maintaining a substantially fluid-tight seal between the container lid and the collection container, wherein the textured sealing surface region is formed by a chemical etching process.

2. The container assembly of claim 1, wherein the container lid is threadingly couplable to the collection container.

3. The container assembly of claim 1, wherein the collection container further comprises a stop ring extending circumferentially thereabout at a location below an exterior threaded portion of the collection container.

4. The container assembly of claim 3, wherein the container lid comprises a flange extending around an outer rim thereof, and wherein a lower surface of the flange is configured to contact an upper surface of the stop ring when the container lid is fully coupled to collection container.

5. A container assembly for collecting a fluid specimen, comprising:
    a collection container having a first end, a second end, and a sidewall extending therebetween and defining a chamber for receiving the fluid specimen, wherein the collection container further comprises a stop ring extending circumferentially thereabout at a location below an exterior threaded portion of the collection container; and
    a container lid couplable to the collection container to at least partially close the first end thereof, wherein the container lid comprises an elongate receptacle extending into the chamber of the collection container, the receptacle having an open end defined within an upper surface of the container lid and being configured to receive a specimen collection tube therein,
    wherein the container lid comprises a sealing interface configured to at least partially contact the collection container when the container lid is coupled to the collection container, and
    wherein the sealing interface includes a textured sealing surface region configured to allow air into or out of the container assembly when the container lid is coupled to the collection container while maintaining a substantially fluid-tight seal between the container lid and the collection container
    wherein the container lid comprises a flange extending around an outer rim thereof, and wherein a lower surface of the flange is configured to contact an upper surface of the stop ring when the container lid is fully coupled to collection container,
    wherein the lower surface of the flange includes a secondary textured sealing surface region configured to allow air into or out of the container assembly when the container lid is coupled to the collection container.

6. The container assembly of claim 5, wherein the secondary textured sealing surface region is formed by a chemical etching process.

7. The container assembly of claim 5, wherein the flange comprises an interior threaded portion configured to enable the container lid to be threadingly coupled to the exterior threaded portion of the collection container.

8. The container assembly of claim 5, wherein the flange comprises a plurality of ribs extending circumferentially thereabout.

9. A container lid for use with a container assembly for collecting a fluid specimen, the container lid comprising:
    a disc-shaped peripheral zone;
    a central zone positioned within the peripheral zone, wherein the central zone comprises an elongate receptacle extending downward therefrom, the receptacle having an open end defined on an upper surface of the central zone and configured to receive a specimen collection tube therein; and
    a flange extending downward from the peripheral zone, wherein the flange comprises an inner surface configured to releasably engage with a collection container, and further wherein at least a portion of the inner surface includes a textured sealing surface region, and wherein the textured sealing surface region is formed by a chemical etching process.

10. The container lid of claim 9, wherein the inner surface further comprises a threaded portion configured to enable the container lid to be threadingly coupled to an exterior threaded portion of a collection container.

11. A container lid for use with a container assembly for collecting a fluid specimen, the container lid comprising:
    a disc-shaped peripheral zone;
    a central zone positioned within the peripheral zone, wherein the central zone comprises an elongate receptacle extending downward therefrom, the receptacle having an open end defined on an upper surface of the central zone and configured to receive a specimen collection tube therein; and
    a flange extending downward from the peripheral zone, wherein the flange comprises an inner surface configured to releasably engage with a collection container, and further wherein at least a portion of the inner surface includes a textured sealing surface region, and wherein the flange further comprises a lower surface, and wherein the lower surface includes a secondary textured sealing surface region configured to allow air into or out of the container assembly when the container lid is coupled to a collection container.

12. The container lid of claim 11, wherein the secondary textured sealing surface region is formed by a chemical etching process.

13. The container lid of claim 9, wherein the flange comprises a plurality of ribs extending circumferentially therearound.

14. A method of forming a container assembly for collecting a fluid specimen, the method comprising:
- providing a collection container having a first end, a second end, and a sidewall extending therebetween and defining a chamber for receiving the fluid specimen; and
- providing a container lid couplable to the collection container to at least partially close the first end thereof, wherein the container lid comprises an elongate receptacle extending downward therefrom, the receptacle configured to receive a specimen collection tube therein, and wherein the container lid further comprises a flange extending around an outer rim thereof, wherein an inner surface of the flange has a textured sealing surface region formed thereon,
- wherein when the container lid is coupled to the collection container, the textured sealing surface region of the container lid contacts a surface of the collection container so as to allow air into or out of the container assembly while maintaining a substantially fluid-tight seal with the collection container.

15. The method of claim 14, further comprising forming a stop ring extending circumferentially about the collection container.

16. The method of claim 15, further comprising forming a secondary textured sealing surface region on a lower surface of the flange, wherein the lower surface of the flange is configured to contact an upper surface of stop ring when the container lid is fully coupled to collection container.

* * * * *